(12) United States Patent
Erwin

(10) Patent No.: US 6,254,140 B1
(45) Date of Patent: *Jul. 3, 2001

(54) SEGMENTED FLANGE INCLUDING A SHIM

(75) Inventor: Roger D. Erwin, Peabody, MA (US)

(73) Assignee: Erwin's LLC, Arlington, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,782

(22) Filed: Sep. 21, 1998

Related U.S. Application Data

(63) Continuation-in-part of application No. 09/046,101, filed on Mar. 23, 1998, which is a continuation-in-part of application No. 08/987,058, filed on Dec. 9, 1997, which is a continuation-in-part of application No. 08/629,187, filed on Apr. 8, 1996, now Pat. No. 5,755,464, which is a continuation-in-part of application No. 08/614,355, filed on Mar. 12, 1996, now abandoned.

(51) Int. Cl.$^7$ ...................................... F16L 23/08
(52) U.S. Cl. ................... 285/3; 285/4; 285/405; 285/424; 285/414
(58) Field of Search .................. 285/3, 4, 405, 285/367, 414, 415, 424

(56) References Cited

U.S. PATENT DOCUMENTS

| | | | | |
|---|---|---|---|---|
| 406,272 | * | 7/1889 | Euvrard | 285/415 |
| 880,302 | * | 2/1908 | Heineman | 285/4 |
| 2,403,606 | * | 7/1946 | Meyer | 285/367 |
| 2,911,239 | * | 11/1959 | Marzolf | 285/415 |
| 3,761,114 | * | 9/1973 | Blakeley | 285/415 |
| 4,750,411 | * | 6/1988 | Eversole | 285/4 |
| 5,286,040 | * | 2/1994 | Gavin | 285/4 |
| 5,468,030 | * | 11/1995 | Walling | 285/415 |
| 5,641,185 | * | 6/1997 | Harth | 285/367 |
| 5,755,464 | * | 5/1998 | Erwin | 285/415 |

FOREIGN PATENT DOCUMENTS

| | | | | |
|---|---|---|---|---|
| 2422096 | * | 12/1979 | (FR) | 285/3 |
| 9855 | * | 12/1988 | (WO) | 285/4 |

* cited by examiner

*Primary Examiner*—Eric K. Nicholson
(74) *Attorney, Agent, or Firm*—Paul J. Cook

(57) ABSTRACT

A flange structure formed from a plurality of joined flange segments is provided. The joined flange segments form a generally circular opening for a conduit. The flange structure can be connected to a substrate by fasteners extending through two oval shaped openings connecting the two forces. At least one shim is attached to the flange segments through narrow bridge connections which can be fractured by hand or with a hand held tool.

8 Claims, 4 Drawing Sheets

SEGMENTED FLANGE INCLUDING A SHIM

REFERENCE TO RELATED APPLICATION

This application is a continuation-in-part of application Ser. No. 09/046,101, filed Mar. 23, 1998, which, in turn is a continuation in part of application Ser. No. 08/987,058, filed Dec. 9, 1997, which in turn is a continuation in part of application Ser. No. 08/629,187, now U.S. Pat. No. 5,755,464 filed Apr. 8, 1996, which, in turn is a continuation in part of application Ser. No. 08/614,355, filed Mar. 12, 1996 now abandoned.

BACKGROUND OF THE INVENTION

This invention relates to a flange structure. More particularly, this invention relates to a flange structure utilized to replace damaged flanges such as flanges utilized to connect conduits.

At the present time, it is common practice to connect conduits with a flange on each conduit together with means for securing the flanges to each other. Automobile exhaust systems are an example of a system of connected conduits which utilize connecting flanges. These exhaust systems include a plurality of connected modules such as pipes, a catalytic converter and an exhaust muffler. The modules are provided with flanges to effect connection with an adjacently positioned module such as with bolts extending through the flanges which are secured with nuts. As automobile exhaust systems are operated in a corrosive environment, particularly in winter conditions when the system is exposed to salt, moisture and sand, portions of the system, including the flanges become severely corroded to the extent that they become detached from an adjacent flange. When this condition occurs, repairs must be made so that connection of modules in the exhaust system can be reestablished in order to permit the system to function properly. Oftentimes, it is not possible to repair the flange, thereby necessitating replacement of the entire module to which the flange is attached. This damaged flange condition also requires unnecessary expense since the remaining portion of the module, such as the exhaust muffler or catalytic converter can be in acceptable working order.

It has been proposed in U.S. Pat. No. 4,519,639 to provide a segmented hinged flange for a conduit. The flange segments are formed from laminated metal sheets which interleave with metal sheets of an adjacently positioned segment at the juncture points between segments. The segments surround a conduit to be attached to an adjacent conduit. The segments are joined by bolts extending through the laminated metal sheets at the juncture points. The joining bolts extend beyond the thickness of the segments and thus increase the effective thickness of the flange. This, in turn, limits the use of the flange to a relatively large volume of space to accommodate both the flange thickness and the added thickness of the added bolts. In addition, the interior size of the flange opening is not adjustable so that a wide size range of flange structures must be provided to accommodate a wide variety of conduit sizes.

U.S. Pat. No. 5,203,593 discloses a flexible exhaust coupling utilizing resilient annular gasket means designed to permit related movement between adjacent joined conduits.

U.S. Pat. No. 5,228,726 discloses an exhaust system clamp having flared flanges for connecting two conduits to permit axial expansion of the conduits during use.

U.S. Pat. No. Des. 263,415 discloses a design for a pipe coupling flange. It would be desirable to provide a flange structure which can be attached to a conduit to accommodate conduits of varying sizes. It would also be desirable to provide such a flange structure including means for attaching the flange structure to a conduit, which occupies a minimum volume. In addition, it would be desirable to provide such a flange structure which can be secured to a slightly damaged conduit surface with a flared end while minimizing or preventing damage to the conduit.

SUMMARY OF THE INVENTION

The present invention provides a flange structure formed from a plurality, usually two or four, mating flange segments, each having a means for connecting the segments together and which include one or more shims to accommodate varying size conduits. Each flange segment is provided with two generally flat faces and an opening connecting the flat faces for housing a means for connecting the flange structure to a substrate such as a second flange. Each flange segment is provided with a generally circular arc surface such as a semi-circular arc surface which, when connected to at least one other flange segment forms a generally circular opening for housing a conduit or pipe having a generally circular outside surface. The means for connecting the segments comprises generally cylindrically shaped housings for accommodating a bolt or the like which extends between adjacent segments but does not extend through the generally flat faces.

The generally circular opening surface at a central portion of the joined segments has a perimeter which extends in a generally parallel direction to the central axis of the opening. One or more shim sections are connected to the generally circular opening to provide a means for reducing the diameter of the opening. The shims are formed integrally with the flange segments and the connections between the flange segments and the shims are constructed so that they can be separated either by hand or with a hand-held tool. The shims have an exposed surface having essentially the same shape as the opening surface.

DESCRIPTION OF SPECIFIC EMBODIMENTS

The flange structure of this invention is formed by connecting a plurality, preferably two, flange segments with connecting means such as bolts or the like which extend between adjacent flange segments but which do not extend through the flat faces of the flange segments. The joined flange segments form a generally circular opening surface which extends in a generally parallel direction to the central axis of the opening. Shim sections formed integrally with the flange segments are provided. The shim sections are joined to the flange segments in a manner which permits their being separated from the flange segments either by hand or with a hand-held tool. The shim sections are used to adjust the size of the central opening. Thus, each flange segment is provided with one or a plurality of removable shim sections. The size of the generally circular opening is determined by the number of shim sections separated and removed from the flange section.

By orienting the connecting means so that their central axis extends in a direction generally parallel to the planes of the flat flange segment surfaces rather than generally perpendicular to these planes, the connecting means do not increase the effective thickness of the flange structure. If the connecting means were oriented so that they passed through the flat flange segment surface, the heads of the bolts as well as the nuts connecting the bolts would extend past the flat flange segment surfaces, thereby effectively increasing the flange structure thickness. This increased effective thickness undesirably increases the minimum volume into which the flange structure can be positioned.

In one embodiment, the flange of this invention is formed of four flange sub-segments which can be joined together to form two flange segments which, in turn, can be joined together to form a flange. Each of the flange sub-segments is provided with one or a plurality of the shim sections which can be removed from the flange sub-section by hand or with a hand-held tool.

In a second embodiment, the flange of this invention can be formed of two flange sections which are joined together to form a flange. Each of the flange segments is provided with one or a plurality of shim sections which can be removed from the flange sections by hand or with a hand-held tool.

Each of the shim sections is attached either to a shim section or to a flange segment or a flange sub-segment by one or a plurality of narrow lengths of material which can be easily fractured by hand or with a hand-held tool to separate a shim section from the remainder of the flange section or sub-section.

Figure 1:
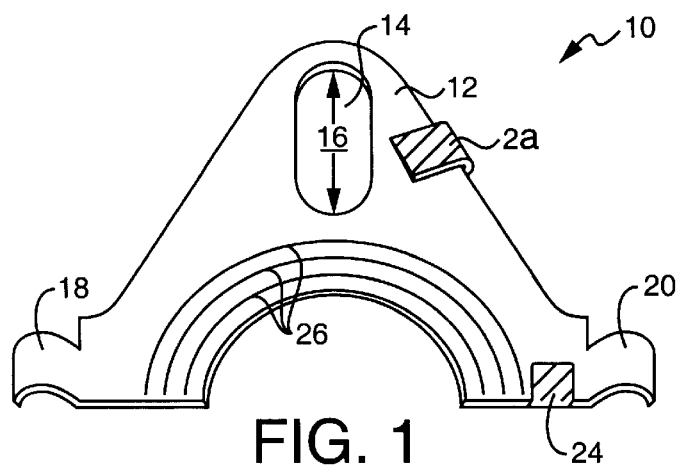
FIG. 1 is a top view of a flange section of a flange structure of this invention.

Referring to FIG. 1, a flange sub-section 10 of this invention is formed of two relatively flat surfaces 12 through which extends an oval shaped opening 14. The opening 14 is shaped to accommodate a fastening device (not shown) such as a bolt, screw or the like.

The oval opening 14 is sized so that a conventional head (not shown) of the fastening device is sized to be positioned on surface 12 while the stem of the fastening device is sized to extend through oval opening 14 and be positioned along the length 16 of opening 14. Each flange subsegment 10 is provided with tabs 18 and 20 shaped to form generally semi-cylindrical openings through which fit conventional fasteners such as bolts or the like.

The flange sub-segment 10 also is provided with bent tabs 22 and 24 having a function which is described with reference to FIG. 2.

Figure 8:
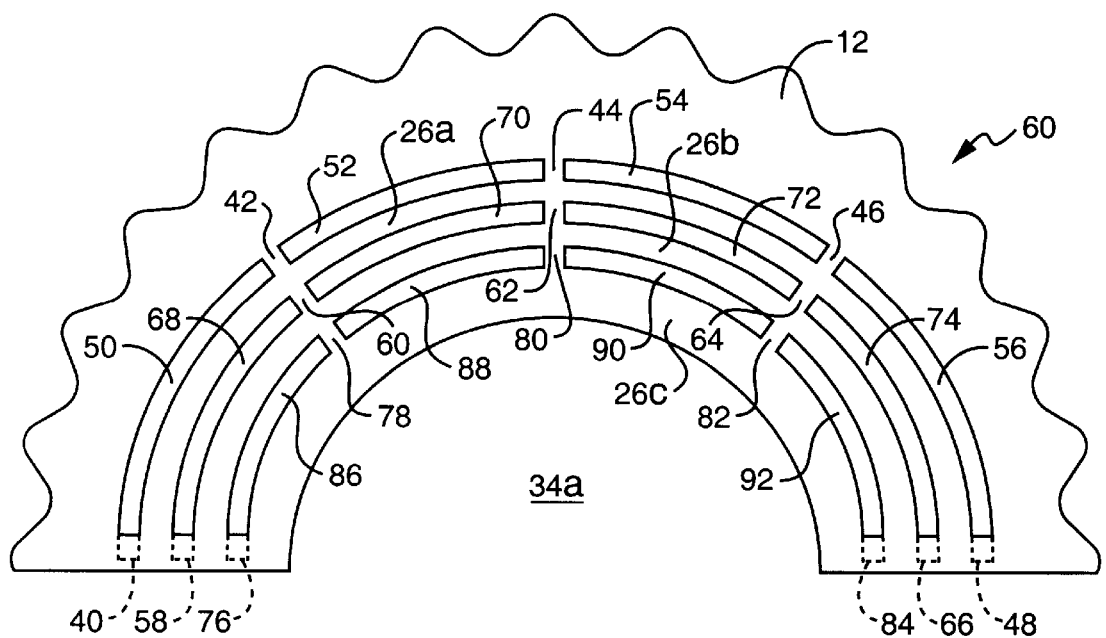
FIG. 8 is a partial view illustrating the shim structure of the flange structures of this invention.

The flange subsegment 10 also is provided with shim sections 26 which are attached to the surface 12 in a manner which is described with reference to FIG. 8.

Figure 2:
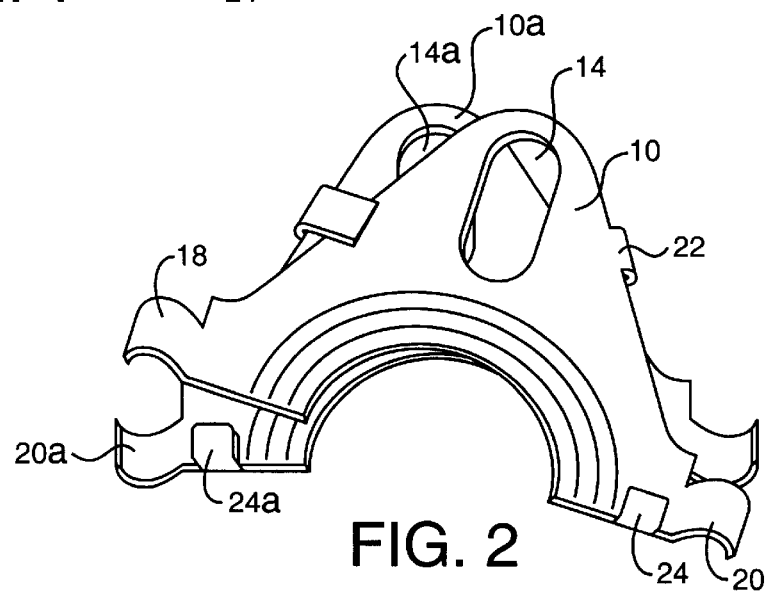
FIG. 2 is a top view illustrating the connection of two flange sections of this invention.
Figure 3:
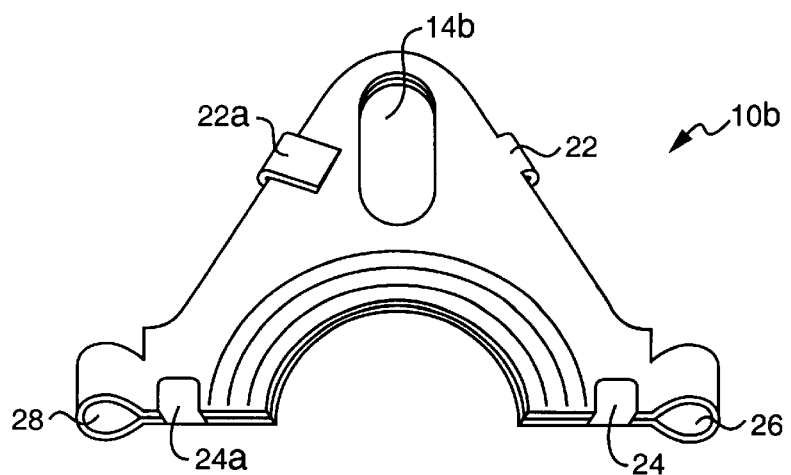
FIG. 3 is a top view of two flange sections connected to form one-half of a flange structure of this invention.

Referring to FIG. 2, two identically shaped flange subsections 10 and 10a are joined together by tabs 22, 22a, 24 and 24a. When so joined, tabs 20 and 18a mate and tabs 18 and 20a mate to form generally cylindrical openings 26 and 28 (FIG. 3) through which can be fit a conventional fastener such as a bolt, screw or the like. Also, as shown in FIG. 3, when the flange subsections 10 and 10a are joined together to form flange section 10b, openings 14 and 14a are aligned to form a single opening 14b.

Figure 6:
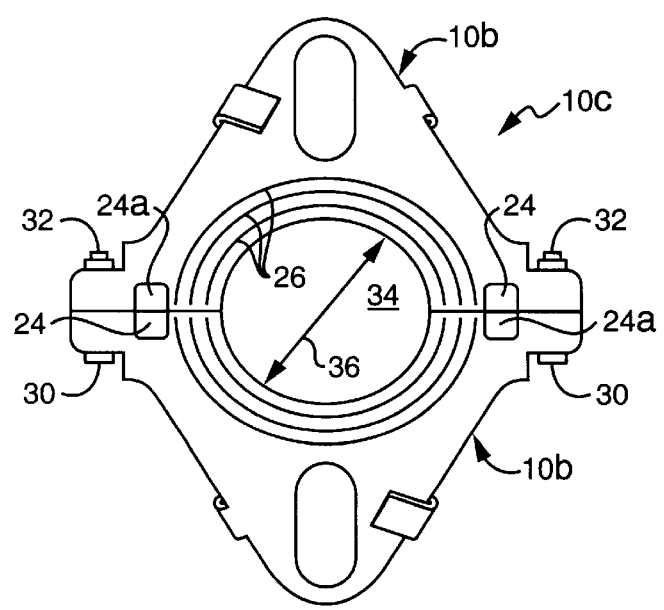
FIG. 6 is a top view of flange structure of this invention formed from four flange sections of FIG. 1.

The final flange product 10c (FIG. 6) is formed from two flange sections 10b. As shown in FIG. 6, two flange sections 10b are joined together to form flange 10c by extending a fastener such as a bolt 30 secured by nut 32 through openings 26 and 28. The size of the central opening 34 is dependent upon the number of shim sections 26 removed from the flange sections 10b. The opening 34 accommodates different size conduits which is dependent upon the number of shim sections 26 that are removed.

The flange segments 10b, are secured about a conduit by virtue of forces exerted by the fastening means such as a bolt and nut extending through the generally cylindrical openings 26 and 28. The flange segments 10b need not contact each other so that the diameter of the central opening 34 formed by the flange segments 10b can be adjusted to accommodate conduits of varying diameter. The opening 34 has a central axis 36 which extends generally parallel to the width of the cylindrical surface formed by the innermost positioned shim section 26.

Since the fastening means 30 extend through generally cylindrical openings 26 and 28, the fastening means 30 does not increase or significantly increase the effective thickness of the flange segments 10b. Thus, the formed flange structure 10 can be positioned within a volume having a maximum thickness as small as the thickness of the flange segments 10b.

The flange sub-segment 10 has a thickness generally between about 1/16 inch and about 1/8 inches so that the thickness of the flange segment 10b and flange 10c is generally between about 1/8 inch and about 1/4 inches.

The structure of the shim sections 26 of FIGS. 1, 2, 3 and 6 will be described with reference to FIG. 8. This description of the shim sections also applies to all other embodiments of this invention including the embodiment shown in FIGS. 4, 5 and 7. The outermost shim section 26 is secured to the solid surface 12 by means of narrow bridge connections 40, 42, 44, 46 and 48. Interposed between the bridge connections and spaces 50, 52, 54 and 56 which extend through the thickness of the flange segment 60. Typically, the flange segment 60 is formed of 10/18 steel or 10/20 steel and the width of the bridge connections and the bridge connections described hereinafter have a width between about 1/32 inch and about 1/2 inch and a thickness between about 1/16 inch and about 1/4 inch. Shim section 26b is attached to shim section 26a through narrow bridge connections 58, 60, 62, 64 and 66. Interposed between these bridge connections are spaces 68, 70, 72 and 74 which extend through the thickness of flange segment 60.

Shim section 26c is connected to shim section 26b through narrow bridge connections 76, 78, 80, 82 and 84. Interposed between these bridge connections are spaces 86, 88, 90 and 92 which extend through the thickness of flange segment 60. The size of opening 34 is dependent upon the number of shim sections which remain attached to the flange section 60. Shim sections 26c, 26b and 26a can be removed from the flange section 60 by applying force by hand or with a hand-held tool since the narrow bridge connecting the shim sections are relatively weak.

Figure 4:
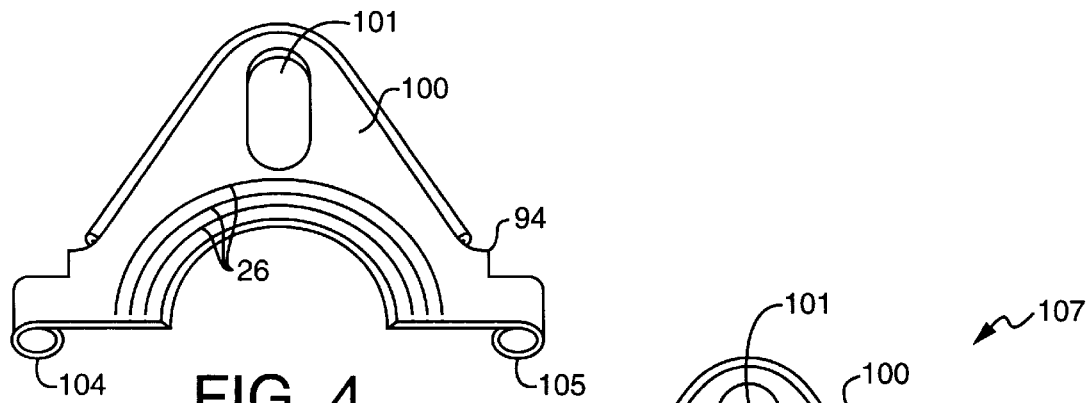
FIG. 4 is a top view of an alternative flange section of this invention.
Figure 5:
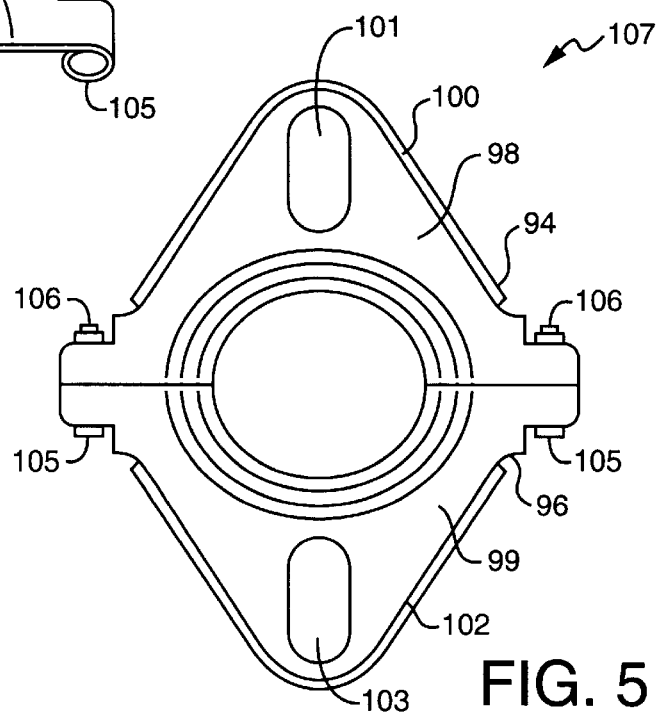
FIG. 5 is a top view of a flange structure of this invention formed from two flange sections of FIG. 4.
Figure 7:
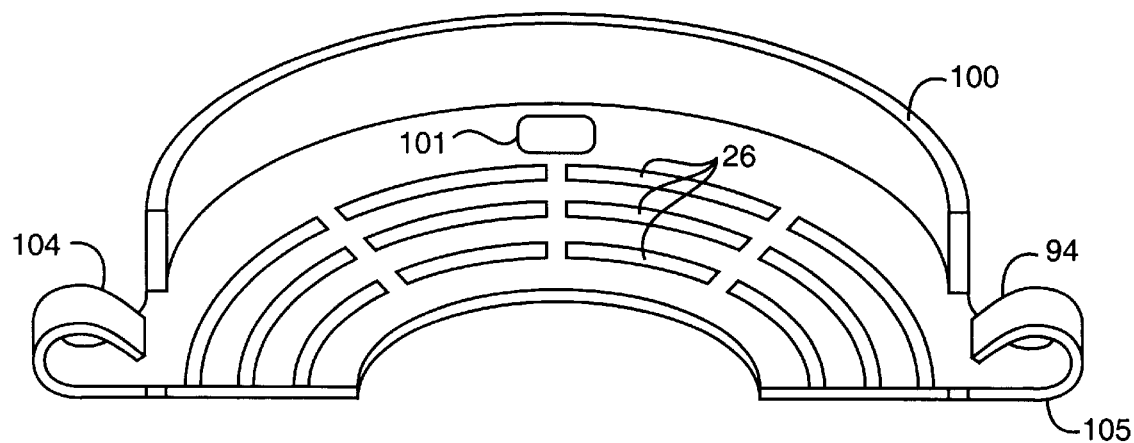
FIG. 7 is a perspective view of the flange section of FIG. 4.

Referring to FIGS. 4, 5 and 7, a second embodiment of the flange structure of this invention 70 is formed from two flange segments 94 and 96 each having a relatively flat section 98 and 99 and a raised border 100 or 102. The oval shaped openings 101 and 103 are shaped to accommodate a stem of a fastening device (not shown) such as a bolt, screw or the like. The oval openings 101 and 103 are sized so that a conventional head (not shown) of the fastening device is sized to extend through oval openings 101 and 103 and be positioned along the length of openings 101 and 103. The oval openings 101 and 103 permit adjustment of the position of flange segments 94 and 96 to permit positioning on a conduit. Each flange segment 94 and 96 is provided with generally cylindrical openings 104 and 105 through which fit conventional fasteners such as bolts or the like in order to secure flange segments 94 and 96 together. In one embodiment, the flat sections 98, generally cylindrical openings 104 and 105 and raised border 100 can be formed from a flat piece with the openings 104 and 105 as well as the border 100 being roll formed.

The shim sections 26 are positioned on the flange sections 94 and 96 in the same manner as described above with reference to FIG. 8. The flange sections 94 and 96 are joined together by fasteners such as bolts 105 and nuts 106.

The flange structure 107 is secured about a conduit by virtue of forces exerted by fastening means such as a bolt and nut extending through the generally cylindrical openings 104 and 105. The flange segments 94 and 96 need not contact each other so that the diameter of the central opening 108 formed by the flange segments 94 and 96 can be adjusted to accommodate conduits of varying diameter.

What is claimed is:

1. A flange segment structure shaped to be joined to at least one other such flange segment structure to form a flange structure which comprises:

a first flange segment having two opposing flat surfaces and an inner generally semicylindrical surface joining said two opposing flat surfaces and extending in a direction generally perpendicular to said two opposing flat surfaces, said first flange segment including a plurality of curved tabs for joining said first flange segment to a second flange segment, said second flange segment having two opposing flat surfaces and an inner generally semicylindrical surface joining said two opposing flat surfaces and extending in a direction generally perpendicular to said two opposing flat surfaces, said second flange segment including a plurality of curved tabs for joining said second flange segment to said first flange structure, fastening means for fastening said first flange segment and said second flange segment to at least one third flange segment structure to form a flange structure, said fastening means extending in a direction generally perpendicular to a central axis of each said generally semicylindrical surface, at least one shim section attached to each said generally semicylindrical surface through a plurality of narrow bridge connections, and means for attaching each said flange segment structure to a substrate.

2. A flange structure comprising four first flange segment structures of claim 1 wherein a first pair of said first flange segment structures are joined together and a second pair of said first flange segment structures are joined together, said first and second pairs of flange segment structures being joined together by said fastening means extending in a direction generally perpendicular to said central axis.

3. The flange structure of claim 2 wherein said means for attaching comprises two oval shaped openings extending between said two faces.

4. A flange segment shaped to be joined to at least one other such flange segment to form a flange structure wherein:

said flange segment comprises two opposing flat surfaces, an inner generally semicylindrical surface joining said two opposing flat surfaces and extending in a direction generally perpendicular to said two opposing flat surfaces and two generally cylindrical members attached to at least one of said two opposing flat surfaces, said generally cylindrical members sized to accomodate fastening means for fastening said flange segment and said at least one other such flange segment through said generally cylindrical members to form a flange structure, wherein said fastening means extend in a direction generally perpendicular to a central axis of said generally semicylindrical surface, at least one shim section attached to said generally semicylindrical surface through a plurality of narrow bridge connections, and means for attaching said flange segment to a substrate.

5. The flange segment structure of claim 4 which includes a raised wall portion connected to at least a portion of the periphery of said flange segment and extending in a direction generally perpendicular to one of said opposing flat surfaces.

6. A flange comprising two flange segment structures of claim 5 joined together by said fastening means extending in a direction generally perpendicular to said central axis.

7. The flange structure of claim 6 wherein said means for attaching comprises two oval shaped openings extending between said two faces.

8. A flange comprising two flange segments of claim 4 joined together by said fastening means extending through said two generally cylindrical members of each of said flange segments.

* * * * *